Dec. 30, 1941.  L. A. MAYBARDUK  2,268,124
CAN TESTER
Filed July 13, 1938  2 Sheets-Sheet 1

INVENTOR
Leon A. Maybarduk,
BY
Fraser, Myers & Pauley
ATTORNEY

Dec. 30, 1941.  L. A. MAYBARDUK  2,268,124
CAN TESTER
Filed July 13, 1938  2 Sheets-Sheet 2

INVENTOR
Leon A. Maybarduk,
BY
Fraser, Myers & Manley
ATTORNEYS.

Patented Dec. 30, 1941

2,268,124

UNITED STATES PATENT OFFICE 2,268,124

CAN TESTER

Leon A. Maybarduk, Brooklyn, N. Y., assignor to E. W. Bliss Company, Brooklyn, N. Y., a corporation of Delaware Application July 13, 1938, Serial No. 218,955

15 Claims. (Cl. 73—51)

My present invention relates to leak-detecting can-testing apparatus and aims to provide certain improvements therein.

In most of the methods of testing now used, the cans are successively supplied to a moving conveyor—usually a wheel—wherein air under pressure is charged into the cans and retained therein for a definite period, the time required for the wheel to make somewhat less than one revolution, and the can, or a pressure-sensitive member associated therewith, is then tested to determine whether any air has escaped therefrom. Where a loss of air is indicated the testing means functions through mechanical or electrical means to operate a segregating means for separating the leaky from the sound cans.

When air under a given pressure is charged into a can, this pressure drops as soon as the admitting valve is shut and continues to drop slowly within the can for a certain time until a state of stabilization of the pressure is reached. This phenomenon of drop in air pressure immediately upon charging the can has always been a formidable obstacle to the provision of simple and rapid means for testing cans. It proved to be so because this drop in pressure was far in excess of the drop caused by largest air leaks which a practical machine must be able to detect, and secondly, because the drop continued (at a decreasing rate) for a time so long that a testing operation had to be slowed down to a degree rendering it valueless for practical commercial application.

At various times during the development of the industry the simple expedient of connecting a resilient pressure sensitive element, such as a Sylphon bellows, directly to a can and charging both through the same duct with air pressure, and relying upon the contraction of the Sylphon be it ever so little, for detection, should the can be leaky, proved absolutely impracticable, due again to the fact that it was necessary to wait too long after charging the can and the Sylphon for the air within to come to a pressure state sufficiently stable to be able to react to small change due to leakage. It was found experimentally, for example, that in the case of a can, four inches in diameter and five inches tall, more than a minute was sometimes required to permit the air within to become stabilized. This, of course, is entirely too long for a practicable machine since cans of above indicated capacity must be tested at a rate which allows each can approximately five to twelve (depending upon the type of machine) seconds for a complete passage through a machine.

The prior art contains a number of patents intended to overcome or neutralize this basic difficulty encountered when utilizing compressed air for testing cans. A survey of the can making industry, with which the applicant is well acquainted, demonstrates that many of these patents proved of no practical value at all and the small percentage of them which were translated into practical machines have succeeded in doing so only at a cost of cumbersome and at times prohibitively expensive devices.

The method of connecting a Sylphon or analogous pressure sensitive means directly to a can is by far more simple than the types of testing machines now in use, since a Sylphon bellows is per se a very sensitive element capable of reacting to minute changes in pressure. The problem is to so employ a Sylphon and connect with it some element in such a way that this reaction to minute changes in pressure will not be lost. At the same time means must be found to repeat this operation very rapidly.

In analyzing the problem, it occurred to me that inventors have heretofore, knowingly or otherwise, ignored the cause of the pressure drop discussed above, and have merely tried to side step the trouble in one way or another.

The cause of the trouble resides in the cooling of air immediately following the rise in temperature due to compression upon charging. I have, therefore, reasoned that for a practical application to can testing, the cooling of the air within the can and Sylphon must be accelerated and its duration shortened. To accomplish this, I have introduced a certain amount of decompression by venting some air from the can and Sylphon immediately after charging both at a slightly higher than operating pressure. I have discovered that this procedure operates very effectively and brings about stabilization in a fraction of the time normally required by the unassisted, unaccelerated drop. The procedure thereby renders fully practical successive tests at required speeds by placing a can and a pressure sensitive element in direct fluid communication, as is hereinafter more fully described.

I have also discovered that my invention provides important practical possibilities for regulating the sensitivity of the machine to greater or lesser leaks as may be desired, as is more fully explained in connection with the coordinates in Fig. 7.

Accordingly, my present invention has for its primary object the provision of improved can-testing apparatus employing Sylphons or analogous pressure sensitive means. A further object resides in reducing the time required for stabilization of the compressed air charged into a can so as to increase the rate at which cans may be tested. A further object resides in providing improved means for holding a contact element in the position which it assumes when the air in a Sylphon attains stabilization, so that the slightest change in pressure in the can being tested will operate to make or break an electrical circuit which is relied upon for detecting a leak. A further object resides in the provision of novel magnetic and mechanical means for holding the contact element in its set position, until the can being tested reaches the testing station. A further object resides in the provision of means for controlling the extent to which stabilization will take place at the time the contact element is set with relation to a Sylphon.

The invention will be better understood from a detailed description which follows when considered in connection with the accompanying drawings wherein I have shown certain preferred embodiments of my invention and wherein—

Figure 7:
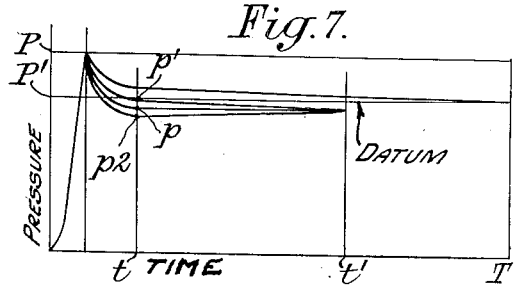

Fig. 7 graphically illustrates a feature of the invention.

Figure 2:
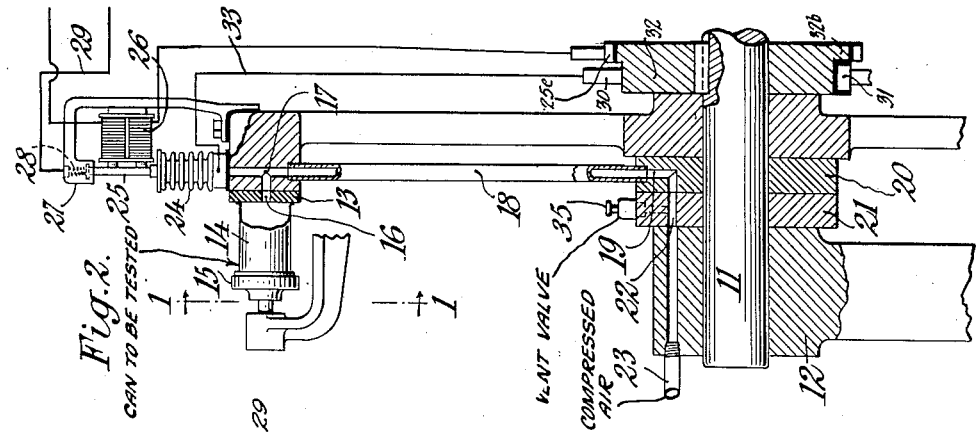
Fig. 2 is a radial section through the testing wheel shown in Fig. 1, said section being taken substantially along the plane of the line 2—2 of Fig. 1.
Figure 1:
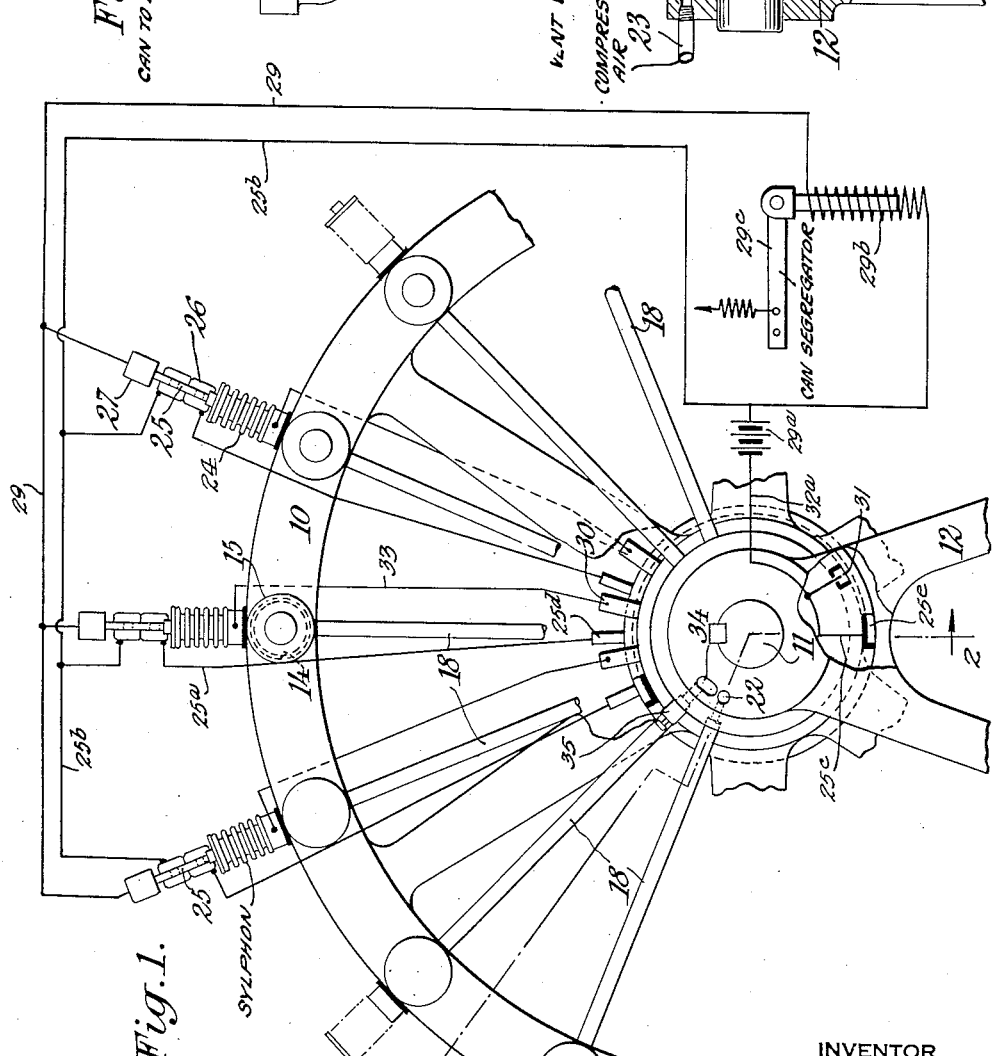
Figure 1 is a fractional side elevation, with parts broken away, of a can-testing wheel having my invention applied thereto and diagrammatically showing the electrical connections therefor.

Referring first to Figs. 1 and 2 of the drawings, the invention is shown as applied to a conventional form of can-testing wheel 10 which is mounted on a shaft 11, one end of which is supported in a bearing on the standard or frame 12. Equally spaced circumferentially about one face of the wheel adjacent the outer periphery thereof are a plurality of can stations, each having a compressible disc or packing 13 against the face of which a can 14 may be held by a can-pressing head or clamping plate 15 suitably supported by the wheel and movable into can-clamping engagement in a well-known manner. For supplying air under pressure to the cans to be tested, the packing 13 has a central opening 16 therethrough which communicates with a T-shaped duct 17 in the wheel. To one end of the T-head of the duct 17 there is connected a tube 18 leading to a duct 19 in a valve ring 20 which is rotatively mounted on the shaft in leak-tight facial engagement with a valve-ring 21, which is non-rotatively mounted on the shaft, the valve-ring 21 having a duct 22 therein for connection with a source of fluid under pressure, preferably air, which is adapted to be supplied to the duct 22 through a pipe 23. The opposite end of the T-head duct 17 leads into a bellowsed metal container or Sylphon 24, one end of which is fixedly mounted on the periphery of the wheel and electrically insulated therefrom, the other end of which is free so as to permit axial expansion and contraction of the Sylphon.

The top of each Sylphon is closed and has normally bearing thereon, but unconnected thereto, a movable lightweight metal element or armature 25 for cooperation with an electro-magnet 26. Preferably the armature 25 extends through a guideway in an electrically insulated bracket 27 supported on the testing wheel 10 so as to be movable in axial alignment with the Sylphon 24 across the poles of the magnet 26. A light coil spring 28 acts upon the armature to normally hold one end thereof in contact with the top of the Sylphon. The armature 25 has connected thereto a wire 29 which forms part of an electrical circuit containing a source of current 29a and a solenoid 29b which controls means 29c for operating the can segregating means (not shown). Each of the Sylphons 24 also has a wire 33 connected thereto which is connected to a contact element 30 which is movable over a contact member 31 on a disc 32 fixedly mounted against rotation on the shaft 11. The contact member 31 is connected through a wire 32a with the source of electrical current 29a. The contact element 30 and the contact member 31 in effect constitute a rotary switch. Each of the electro-magnets 26 also has leads 25a, 25b and 25c connected to a source of current 29a for energizing and de-energizing the magnet as the various can stations pass definite points in their rotation about the axis of the wheel. Each of the leads 25a carries a contact element 25d which engages over a contact segment 25e mounted in a flanged portion 32b of disc 32. It will be noted that the location of the contact member 31 is at a point in the rotation of the testing wheel slightly in advance of the can segregating station and that the contact segment 25e extends from a point immediately following the venting station to a point beyond the contact member 31 in the direction of rotation of the testing wheel.

The valve ring 21, in closely spaced relation to the duct 22 therein, has a duct 34 and connected with said duct is a venting valve 35 of any desired type, the function of which will presently appear.

Figure 3:
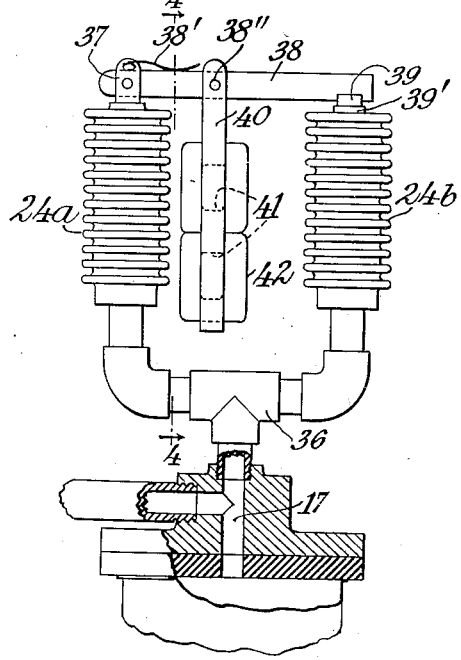
Fig. 3 is a front elevation of a modified form of testing unit with connection thereof to the can-clamping head being shown partially in section.
Figure 4:
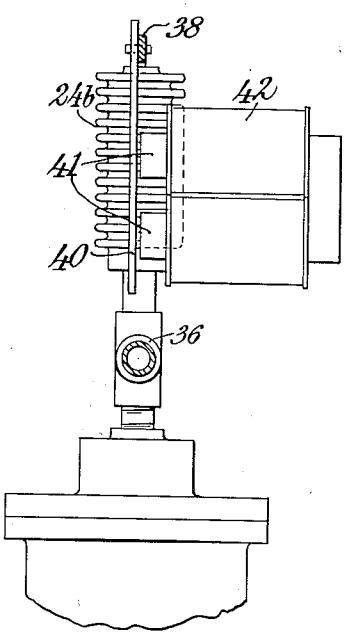
Fig. 4 is a side elevation of the testing unit shown in Fig. 3.

In Figs. 3 and 4 I have shown a means of amplifying or magnifying the effect of a slight contraction of a Sylphon whereby to insure a break in the electrical contacts between the armature and the Sylphon in the case of small leaks. In said figures in lieu of having a single Sylphon mounted at each can station, I propose to connect to one end of the duct 17 two Sylphons 24a and 24b, mounted in parallel relation and in fluid communication with each other through a T-fitting 36, each of said Sylphons being mounted for free axial expansion and contraction. Pivotally mounted to an ear 37 at the free end of the Sylphon 24a is a bar 38, the free end of which has a contact element 39 which is normally urged against a contact element 39' at the free end of the Sylphon 24b by a leaf spring 38'. Pivotally depending from the bar 38 intermediate the ends thereof as at 38", and preferably nearer to its pivotally mounted end, is an element or armature 40, which is disposed to move across the poles 41 of an electro-magnet 42. It will be apparent that as air under pressure is admitted to the Sylphons they will both elongate and carry with them the bar 38 and the armature 40. Now if the armature 40 is held in the position to which it has been moved and the Sylphons then partially contract because of a leak in the can with which they are connected, the contacts 39 and 39' will move away from each other and in view of the pivotal connections at 37 and 38'' the magnitude of this movement will be far greater than the contraction of the Sylphons.

Figure 5:
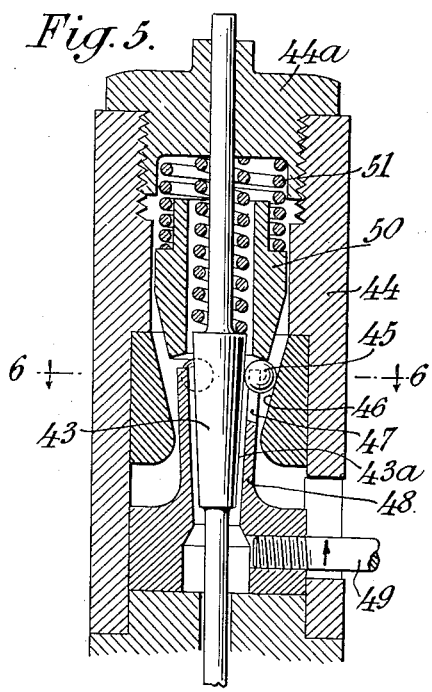
Fig. 5 is a longitudinal section through a further modification of a testing unit.
Figure 6:
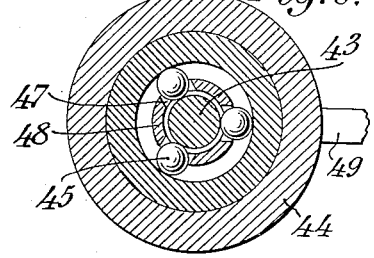
Fig. 6 is a section taken along the plane of the line 6—6 of Fig. 5.

In Figs. 5 and 6 I have shown mechanical frictional means for holding the element or member which is moved by the Sylphon in the position to which it has been moved, independently of the pressure within the Sylphon. The means consists of a spring biased plunger 43 which is guided through the top 44a of an electrically insulated casing 44 which is to be supported on a wheel 10 by any suitable means in such a manner as to place its plunger 43 in a position identical with armature 25 relative to Sylphon 24 on Figures 1 and 2. The spring biased plunger 43 has a tapered or conical wall 43a and disposed in rolling contact with said tapered wall is a plurality of balls 45 which are supported on a tapered or conical wall 46 on the interior of the casing 44. The balls 45 are guided in their movements by being disposed in longitudinal slots 47 formed in the end of a sleeve 48 which is adapted to be moved relatively to the casing 44 by engagement of means (not shown) with a radially extending rod 49 carried by the sleeve 48. Disposed within the casing 44 is a sleeve 50 which is biased by a spring 51 into bearing engagement with the balls 45 to normally hold them in frictional engagement with the tapered wall 46.

In the normal operation of the can-testing apparatus, cans will be successively fed to the can stations on the wheel 10 and clamped in leaktight relation to the packing 13 in a conventional manner. As the testing wheel rotates about its axis and preferably immediately after the can is clamped in position, air under pressure is charged through the supply pipe 23, the ducts in the valve rings 21 and 20, and the tube 18 to the interior of the can and to the Sylphon in fluid communication therewith. Movement of the valve ring 20 cuts off the air supply and confines the air under pressure within a can and its communicating Sylphon.

The air, upon entering a can and a Sylphon, initially excessively expands the Sylphon but immediately thereafter the Sylphon partially contracts because the expansion of the air upon entering the Sylphon is accompanied by a sudden drop in pressure and the pressure thereafter continues to slowly drop until stabilization of the air pressure is reached. As this normally requires more time than is available for the testing operation stabilization is accelerated by venting part of the air from the can and the Sylphon shortly and preferably immediately after charging. This is accomplished as the valve ring 20 rotates by bringing the port in the ring 20 leading from tube 18 into communication with port 34 and vent valve 35. This venting is continued for a predetermined period and at a rate which can be governed by adjustment of the valve 35 which is preferably of the needle type. Elongation and contraction of the Sylphon will carry with it the movable element or armature 25 (Figs. 1 and 2) or the elements 38 and 40 (Figs. 3 and 4) or the spring biased plunger 43 (Figs. 5 and 6). Shortly after the venting operation the electro-magnet 26 (Figs. 1 or 2) and the electro-magnet 42 (Figs. 3 and 4) is then energized by engagement of the contact element 25d with the contact segment 25e, thereby serving to hold the armatures 25 or 40, respectively, in the position in which it was left by (and in contact with) the partly contracted Sylphons at the end of the venting operation. If the can has a leak therein, air will be lost therefrom thereby reducing the pressure within the Sylphon, causing it to contract. This contraction operates to break the electrical contact between the Sylphon and the electro-magnet armature, which break is detected when the can reaches the testing station in proximity to the can discharge point on the testing wheel, i. e. when the contact element 30 of the particular Sylphon engages the contact member 31, and this break in the circuit operates through electrical means 29a and 29b for setting can segregating means which is controlled by 29c for separating the leaky from the sound cans. The segregating means per se are not shown since it will be apparent that any type of such means may be used in conjunction with the present invention.

After the cans have been tested and discharged from the testing wheel the electro-magnets are de-energized as contact is broken between the element 25d and the contact segment 25e in the continued rotation of the wheel, whereupon the armatures will be returned into contact with the contracted Sylphons by the springs 28 of Fig. 2 or by leaf spring 38' of Fig. 3.

Where a friction controlled plunger 43 (Figs. 5 and 6) is employed for co-operation with a Sylphon in a manner identical with armature 25 (Figs. 1 and 2), it will be appreciated that as said plunger is moved outwardly by the Sylphon, i. e. upwardly as shown in Fig. 5, the balls 45 will be moved downwardly along the tapered wall 46 by the pressure of the springs 51 on the sleeve 50 and thus operate to hold the plunger in its outwardly moved position. After a can has been tested and discharged and the Sylphon returned to its normal contracted condition, the rod 49 will be engaged by means (not shown) to move the sleeve 48 and with it the balls 45 outwardly along the tapered wall 46 whereupon the plunger 43 will be biased by its spring into engagement with the Sylphon. It will be understood, however, that the friction balls 45 will be held inoperative to hold the plunger in its Sylphon distended position until after the venting operation, thereby permitting the plunger to follow the contraction of the Sylphon. Upon release of the rod 49 the spring 51 will function to move the balls inwardly into operative relation with the tapered wall 46 and plunger 43. It will thus be appreciated that I have provided a sensitive and effective means for controlling the contact elements which determine the soundness or unsoundness of the cans being tested.

To increase the sensitiveness of the testing operation so that minute leaks can be definitely detected, I propose to so control the stabilization of the air within the can as to promote the detection of such minute leaks. This is accomplished in the following manner, reference being had to Fig. 7 of the drawings.

Considering the graph shown in Fig. 7, let it be assumed that the air is charged into the can, and of course into the Sylphon communicating therewith at a pressure P. Should the valve be shut off and the pressure allowed to come to a non-varying value P' a time T would have to elapse before testing may be started since the drop in pressure would not be indicative of a leak through the can. The time T, however, is greater than the time allotted for a can to pass through the machine, hence if pressure P immediately upon being transmitted into the system is deliberately lowered within time $t$ by venting part of the air from the system it will be substantially stabilized at a value $p$ which may be relied upon as a datum point for testing the can for leakage.

I have further determined that if the stabilization of the pressure by venting part of the air is carried to a point just short of true stabilization, for example, $p'$, and said pressure used as a datum point for testing the can, that in the interval between the time $t$ at which the venting ceases and the time $t'$ at which the can is subjected to the final test, the state of true stabilization will have further progressed which would give rise to a slight contraction of the Sylphon. This contraction, however, is insufficient to effect the break of the contact points which would indicate a leak in the can. However, when this slight contraction is supplemented by the contraction resulting from a minute leak in the can, the combined effect will be sufficient to break the circuit and thereby detect minute leaks.

The same principle may be employed for rendering the machines less sensitive to small leaks so that the machine will only reject cans with major leaks. This may be accomplished by venting the air after charging to a point beyond stabilization, say to pressure $p^2$, or bringing about a state of unstabilization, in the reverse order. That is to say, causing a contraction of the Sylphon beyond which it would contract if the air were truly stabilized. Under such conditions the air in the Sylphon in reaching true stabilization will slightly increase in pressure to $p$ and slightly distend the Sylphon. Hence, if the contact elements are locked in position at the end of the venting operation loss of air from the Sylphon due to minute leaks will be counteracted by the normal tendency of the Sylphon to again distend and hence only substantial or major leaks would thereby operate to break the circuit when the can reaches the testing point.

From the foregoing detailed description it will be apparent that I have provided improved means and a novel method of can-testing, whereby greater efficiency and control in the testing operation can be accomplished. It is to be understood, however, that, while I have shown and described certain specific means for carrying out my invention in combination with a Sylphon, I do not wish to be limited to the specific means disclosed since these may be varied within the range of engineering skill without departing from the spirit of my invention. Hence, where in the claims a Sylphon is referred to, such claims are to be construed as applicable to any analogous pressure-sensitive means.

What I claim is:

1. A can testing unit comprising means for supporting a can to be tested, a Sylphon mounted to permit free axial expansion and contraction and adapted to be placed in fluid communication with a can to be tested, valve controlled means for charging fluid under the same pressure to said can and to the Sylphon, reference means unconnected to but movable by the Sylphon as it is axially expanded by the admission of fluid under pressure thereinto, the reference means and the Sylphon having electrical contacts in a circuit through which current can pass when said parts are in engagement, means under control of said contact circuit for detecting leakage in the can, and means independent of the Sylphon for holding the reference means in the position to which it has been moved.

2. A can testing unit according to claim 1 wherein the means for holding the means movable by the Sylphon is an electro-magnet.

3. A can testing unit according to claim 1 wherein the means for holding the means movable by the Sylphon are frictionally operative.

4. A can testing unit comprising means for supporting a can to be tested, a Sylphon mounted to permit free axial expansion and contraction and adapted to be placed in fluid communication with a can to be tested, means for charging fluid under the same pressure to the can and to the Sylphon, a guided reference element unconnected to but normally held in contact with and movable by the Sylphon as it is axially expanded by the admission of fluid under pressure thereinto, a spring acting upon said reference element to normally hold it in contact with the Sylphon and means for acting upon the reference element for holding in the position to which it has been moved.

5. A can testing unit according to claim 4 wherein the means for holding the spring biased element in the position to which it has been moved is an electro-magnet and wherein the reference element is the armature of said electro-magnet.

6. A can testing unit comprising two Sylphons mounted in parallel relation and in fluid connection with each other at their mounted ends to permit free axial expansion and contraction and adapted to simultaneously be placed in fluid communication with a can to be tested, means for charging fluid under pressure to the Sylphons and to the can to be tested, a bar pivotally connected to the free end of one of the Sylphons and normally held against the free end of the other Sylphon and movable by the Sylphons as they are axially expanded by the admission of fluid under pressure thereto, an armature pivotally mounted to the bar intermediate the ends thereof and an electro-magnet for holding the armature in the position to which it has been moved, independently of the pressure fluid acting upon the Sylphons.

7. A can testing unit comprising a Sylphon mounted to permit free axial expansion and contraction and adapted to be placed in fluid communication with a can to be tested, means for charging fluid under pressure to the Sylphon and to the can to be tested, a guided spring biased element unconnected to but normally held in contact with and movable by the Sylphon as it is axially expanded by the admission of pressure thereinto, said spring biased element having a tapered end wall and means for holding the spring biased element in the position to which it has been moved independently of the pressure fluid action upon the Sylphon, said last mentioned means comprising a member complementally disposed in spaced relation to the tapered wall on the spring biased element and having a more pronounced tapered wall than said spring biased element and a friction member disposed between said tapered walls and biased by spring means to move toward the vertex of the angle formed by the tapered walls.

8. A can testing unit according to claim 7 wherein the friction member comprises a ball supported on the tapered wall of the complemental member and bearing against the tapered wall on the spring biased member.

9. A can testing unit comprising means for supporting a can to be tested, a Sylphon mounted to permit free axial expansion and contraction and adapted to be placed in fluid communication with a can to be tested, valve controlled means for charging fluid under the same pressure to said can and to the Sylphon, valve controlled means for venting part of the fluid from the Sylphon and from the can after charging, reference means unconnected to but movable with the Sylphon as it is axially expanded and contracted and means for holding the reference means in the position which it assumes after the Sylphon has contracted due to the venting of fluid therefrom.

10. A can testing unit comprising means for supporting a can to be tested, a Sylphon mounted to permit free axial expansion and contraction and adapted to be placed in fluid communication with a can to be tested, valve controlled means for charging fluid under the same pressure to said can and to the Sylphon, valve controlled means for venting part of the fluid from the Sylphon and from the can after charging, reference means unconnected to but movable with the Sylphon as it is axially expanded and contracted and means independent of the Sylphon for holding the reference means in the position which it assumes after the Sylphon has contracted due to the venting of fluid therefrom.

11. A can testing unit according to claim 9 wherein the valve controlled means for venting part of the fluid is adjustable so as to control the rate at which fluid will be vented.

12. A can testing device comprising a plurality of stations for receiving cans to be tested, each station having a Sylphon mounted to permit free axial expansion and contraction and adapted to be placed in fluid communication with a can to be tested when received at a station, means for supplying fluid under pressure to the interior of each can and its communicating Sylphon, means at each station unconnected to but movable by the Sylphon as it is expanded by the admission of fluid under pressure thereinto, the last mentioned means and the Sylphon having electrical contacts in a circuit through which current will pass when said parts are in engagement, means for holding the means movable by the Sylphon in the position to which it has been moved, means for causing successive engagement of the electrical contacts at each station with testing means whereby an open circuit, due to the contraction of the Sylphon, will indicate the loss of air from the can in communication with said Sylphon.

13. A can testing device comprising a plurality of stations for receiving cans to be tested, each station having a Sylphon mounted to permit free axial expansion and contraction and adapted to be placed in fluid communication with a can to be tested when received at a station, means for supplying fluid under pressure to the interior of each can and its communicating Sylphon, means for venting fluid from each can after the fluid is charged thereinto, means at each station unconnected to but movable with the Sylphon as it is expanded by the admission of fluid under pressure thereinto and the venting of fluid therefrom respectively, the last mentioned means and the Sylphon having electrical contacts in a circuit through which current will pass when said parts are in engagement, means for holding the means movable by the Sylphons in the positions which they assume after contraction of the Sylphons due to the venting of fluid therefrom, means for causing successive engagement of the electrical contacts at each station with testing means whereby an open circuit due to the contraction of a Sylphon beyond that resulting from the initial venting will indicate the loss of air from the can in communication with said Sylphon.

14. The method of testing a can for airtightness which comprises temporarily hermetically sealing a can, charging air under pressure to the interior thereof, substantially stabilizing the pressure within the can by venting part of the air therefrom after charging, and relying upon the pressure within the can at the end of the venting period as a datum point for determining subsequent loss of air due to leakage.

15. The method of aiding in the detection of small leaks in cans, which comprises temporarily hermetically sealing a can, charging air under pressure to the interior of said can, venting part of the air from said can after charging and carrying said venting to a point where the pressure will be slightly above the true stabilized pressure and relying upon the pressure within the can at the end of the venting period as a datum point for determining loss of air due to leakage.

LEON A. MAYBARDUK.

CERTIFICATE OF CORRECTION.

Patent No. 2,268,124. December 30, 1941.

LEON A. MAYBARDUK.

It is hereby certified that error appears in the printed specification of the above numbered patent requiring correction as follows: Page 2, second column, line 36, for "dics" read --disc--; page 3, first column, line 71, for "(Figs. 1 or 2) and" read --(Figs. 1 and 2) or--; page 4, second column, line 55, claim 7, strike out "end"; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.